US008660875B2

(12) United States Patent
Yedatore et al.

(10) Patent No.: US 8,660,875 B2
(45) Date of Patent: Feb. 25, 2014

(54) AUTOMATED CORRECTIVE AND PREDICTIVE MAINTENANCE SYSTEM

(75) Inventors: Manjunath Yedatore, Austin, TX (US); Deepak Bhatia, San Jose, CA (US); John Prescott, Morgan Hill, CA (US)

(73) Assignee: Applied Materials, Inc., Santa Clara, CA (US)

( * ) Notice: Subject to any disclaimer, the term of this patent is extended or adjusted under 35 U.S.C. 154(b) by 139 days.

(21) Appl. No.: 12/917,434

(22) Filed: Nov. 1, 2010

(65) Prior Publication Data
US 2011/0137697 A1 Jun. 9, 2011

Related U.S. Application Data

(60) Provisional application No. 61/257,415, filed on Nov. 2, 2009.

(51) Int. Cl.
G06Q 10/00 (2012.01)
(52) U.S. Cl.
USPC ........................................ 705/7.12; 705/7.11
(58) Field of Classification Search
USPC ........ 705/2, 7.13, 7.16, 7.19, 7.21, 7.26, 342; 340/10.51; 700/17–121; 701/29.5; 707/999.107; 709/238
See application file for complete search history.

(56) References Cited

U.S. PATENT DOCUMENTS

| 5,311,562 | A | * | 5/1994 | Palusamy et al. | 376/215 |
|---|---|---|---|---|---|
| 5,331,579 | A | * | 7/1994 | Maguire et al. | 703/2 |
| 5,621,664 | A | * | 4/1997 | Phaal | 702/57 |
| 5,754,451 | A | * | 5/1998 | Williams | 702/185 |
| 5,940,290 | A | * | 8/1999 | Dixon | 700/9 |
| 6,041,263 | A | * | 3/2000 | Boston et al. | 700/32 |
| 6,110,214 | A | * | 8/2000 | Klimasauskas | 703/2 |
| 6,298,454 | B1 | * | 10/2001 | Schleiss et al. | 714/37 |
| 6,421,571 | B1 | * | 7/2002 | Spriggs et al. | 700/17 |
| 6,820,038 | B1 | * | 11/2004 | Wetzer et al. | 702/184 |
| 6,928,391 | B2 | * | 8/2005 | Fujiyama et al. | 702/185 |
| 7,162,312 | B2 | * | 1/2007 | Gross et al. | 700/79 |
| 7,269,569 | B2 | * | 9/2007 | Spira et al. | 705/7.36 |
| 7,406,431 | B2 | * | 7/2008 | Spira et al. | 705/7.21 |

(Continued)

FOREIGN PATENT DOCUMENTS

| KR | 10-2008-0022626 A | 3/2008 |
|---|---|---|
| KR | 10-2009-0003434 A | 1/2009 |
| KR | 10-2009-0068867 A | 6/2009 |
| WO | 2010/055170 | 11/2010 |

OTHER PUBLICATIONS

Mathew, Avin D et al. "Reducing maintenance cost through effective prediction analysis and process integration." Advances in Vibration Engineering 5.2 (2006): 87-96.*

(Continued)

*Primary Examiner* — Alan S Miller
(74) *Attorney, Agent, or Firm* — Blakely, Sokoloff, Taylor & Zafman LLP

(57) ABSTRACT

A method and system for automated corrective and predictive maintenance is described herein. In one embodiment, a failure notification associated with a tool is received, wherein the failure notification indicates one or more failure events for the tool. Maintenance data associated with the tool is obtained, wherein the maintenance data includes one or more maintenance events for the tool. An optimal schedule is created for the tool by merging the failure notification and the maintenance data.

22 Claims, 8 Drawing Sheets

(56) References Cited

U.S. PATENT DOCUMENTS

| | | | |
|---|---|---|---|
| 7,418,366 B2* | 8/2008 | Tonack et al. | 702/184 |
| 7,444,200 B1* | 10/2008 | Qu et al. | 700/121 |
| 7,475,122 B2* | 1/2009 | Azpitarte | 709/217 |
| 7,502,744 B2* | 3/2009 | Garrow et al. | 705/1.1 |
| 7,634,384 B2* | 12/2009 | Eryurek et al. | 702/182 |
| 8,473,078 B1* | 6/2013 | Ybarra, III | 700/28 |
| 2002/0035495 A1* | 3/2002 | Spira et al. | 705/7 |
| 2002/0078236 A1* | 6/2002 | Mar et al. | 709/238 |
| 2002/0123864 A1* | 9/2002 | Eryurek et al. | 702/188 |
| 2002/0143420 A1* | 10/2002 | Jackson et al. | 700/100 |
| 2002/0143421 A1* | 10/2002 | Wetzer | 700/100 |
| 2003/0028269 A1* | 2/2003 | Spriggs et al. | 700/83 |
| 2003/0130755 A1* | 7/2003 | Bazzocchi et al. | 700/100 |
| 2004/0186927 A1* | 9/2004 | Eryurek et al. | 710/12 |
| 2004/0193467 A1 | 9/2004 | Williams et al. | |
| 2005/0004821 A1* | 1/2005 | Garrow et al. | 705/7 |
| 2006/0273918 A1 | 12/2006 | Ram et al. | |
| 2007/0200683 A1* | 8/2007 | Colby | 340/10.51 |
| 2008/0086320 A1* | 4/2008 | Ballew et al. | 705/1 |
| 2008/0288321 A1* | 11/2008 | Dillon et al. | 705/9 |

OTHER PUBLICATIONS

Zhou, Junhong, et al. "Intelligent prediction monitoring system for predictive maintenance in manufacturing." Industrial Electronics Society, 2005. IECON 2005. 31st Annual Conference of IEEE. IEEE, 2005.*

Ellis, Byron A. "Condition Based Maintenance." The Jethro Project (2008): 1-5.*

Written Opinion of the International Searching Authority for PCT/US2010/055170, mailed Jun. 27, 2011, 4 pages.

International Preliminary Report on Patentability for PCT/US2010/055170, mailed Jun. 27, 2011, 5 pages.

* cited by examiner

300

MAINTENANCE DATA — 305
| CLEAN TOOL | 01/01/2010 |
| TOP OFF FLUID LEVELS | 01/01/2010 |
| REPLACE PART | 12/31/2010 |
| UPDATE SOFTWARE | 01/15/2010 |
| UPDATE FIRMWARE | 01/30/2010 |

305 — CLEAN TOOL
310 — TOP OFF FLUID LEVELS
315 — REPLACE PART
320 — UPDATE SOFTWARE
325, 330, 335, 340 — dates

NOTIFICATION DATA — 355
| CLEAN CHAMBER X | 01/01/2010 |
| PART Y FAIL | 01/17/2010 |

OPTIMAL SCHEDULE

| CLEAN TOOL | 01/01/2010 |
|---|---|
| TOP OFF FLUID LEVELS | 01/01/2010 |
| CLEAN CHAMBER X | 01/01/2010 |
| UPDATE SOFTWARE | 01/15/2010 |
| PART Y FAIL | 01/17/2010 |

FIG. 4

AUTOMATED CORRECTIVE AND PREDICTIVE MAINTENANCE SYSTEM

RELATED APPLICATIONS

This patent application claims the benefit under 35 U.S.C. §119(e) of U.S. provisional application No. 61/257,415, filed Nov. 2, 2009, which is herein incorporated by reference.

TECHNICAL FIELD

Embodiments of the present invention relate to maintenance systems, and more specifically to an automated corrective and predictive maintenance system.

BACKGROUND OF THE INVENTION

Equipment purchased by a customer may require support from a seller of the equipment. Furthermore, equipment requires services to repair or replace parts of the equipment that are malfunctioning or no longer functioning. Remote services and support for the equipment has a three level operational escalation model: (1) local level, (2) regional level, and (3) global level. A local level engineer is generally onsite or very close to the equipment site. A regional level engineer is typically offsite is and is very experienced for the particular piece of equipment. A global level engineer is typically offsite and is an expert in all the equipment making up a factory.

When the equipment has failed or there is an imminent likelihood of the equipment failing, an engineer at the local level opens a trouble ticket. If the local level engineer can solve the issue, the local level engineer performs the necessary corrective action and closes the trouble ticket. If the issue is not solved by the local level engineer within a specific amount of time, the trouble ticket automatically gets escalated from the local level to the regional level. Depending on the time of escalation, the trouble ticket gets escalated to the region that is running their day shift. If the regional level engineer is not able to solve the problem, the issue is escalated to the global level. The global level engineer may determine that a local level engineer must be dispatched to the site of the equipment with instructions from the global level engineer for fixing the problem.

The engineers at the regional and global levels have access to one or more log files created by the piece of equipment. The engineers may also access a server to search for a similar issue that might have occurred and been solved in the past for the piece of equipment.

In order to investigate the problem at the regional and global levels, remote capabilities must be used to perform troubleshooting, such as remote secure access to the equipment computer, equipment log files, equipment sensor data, etc. However, due to custom architecture of equipment, the log files provided by the piece of equipment vary depending on the piece of equipment. The size of the log files as well as the variance in the log files may slow down the response at the regional and global levels. Furthermore, the down time for scheduled maintenance of the equipment and the down time for unscheduled failures of the equipment may occur within a short period of time, thereby causing an inconvenience to a user of the equipment. In one example, a piece of equipment takes one hour to cool down in order to perform corrective actions, one hour to perform the corrective action, and one hour to warm back up again to perform operations. If a scheduled maintenance of the equipment occurs on a first day, the equipment would be down for three hours. If an unscheduled down time occurs the next day), the equipment would be down for an additional three hours, for a total of six hours of down time across two days.

BRIEF DESCRIPTION OF THE DRAWINGS

The present invention is illustrated by way of example, and not by way of limitation, in the figures of the accompanying drawings and in which:

FIG. 3A illustrates exemplary maintenance data used by an automated corrective and predictive maintenance system in accordance with embodiments of the present invention;

FIG. 3B illustrates exemplary notification data used by an automated corrective and predictive maintenance system in accordance with embodiments of the present invention;

FIG. 4 illustrates an exemplary optimal schedule provided by an automated corrective and predictive maintenance system in accordance with embodiments of the present invention;

DETAILED DESCRIPTION

Embodiments of the invention are directed to a method and system for an automated corrective and predictive maintenance. A failure notification associated with a tool is received. Maintenance data associated with the tool is obtained. An optimal schedule is created for the tool by merging events indicated in the failure notification and maintenance events.

By creating an optimal schedule for the tool, the overall down time of the tool can be reduced. For example, a piece of equipment takes one hour to cool down in order to perform corrective actions, one hour to perform the corrective action, and one hour to warm back up again to perform operations. If a tool was to have a scheduled maintenance on one day and an unscheduled failure the next day, the overall down time for the tool would be six hours. However, using the optimal schedule, a user would know the maintenance that must be performed, as well as any upcoming predicted failures of the tool. The user could use this information to perform the maintenance and the fixes for the predicted failure at the same time. Using this information, the overall down time for the tool would be reduced to four hours (one hour for the cool down, one hour for the corrective action, one hour for the predictive action, and one hour to warm up).

Figure 1:
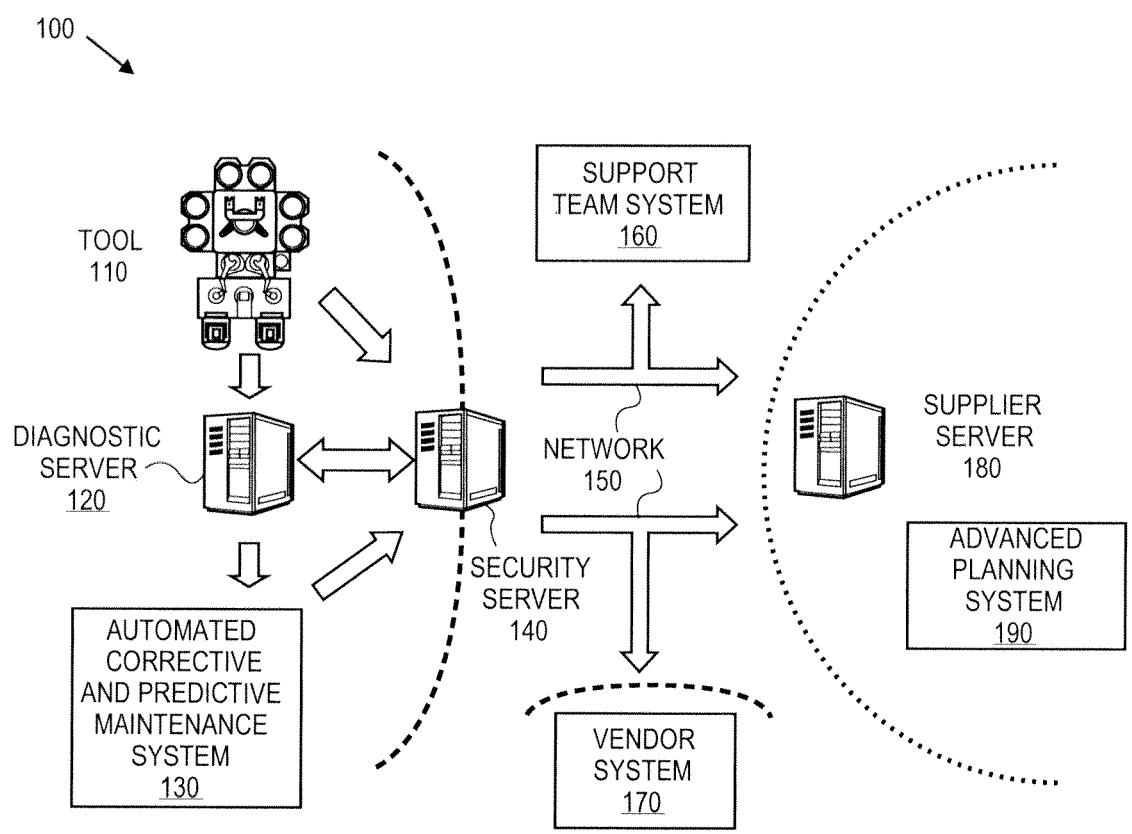
FIG. 1 illustrates an exemplary system on which embodiments of the present invention may be implemented.

FIG. 1 illustrates an exemplary system on which embodiments of the present invention may be implemented. System 100 includes one or more tools 110, a diagnostic server 120, automated corrective and predictive maintenance system 130, security server 140, network 150, support team system 160, vendor system 170, supplier server 180, and advanced planning system 190. In one embodiment, tool 110 can be a manufacturing tool running one or more processes that creates semiconductor devices. In an alternate embodiment, tool 110 can be a manufacturing tool running one or more processes that creates solar devices. Diagnostic server 120, automated corrective and predictive maintenance system 130, and security server 140 can be maintained by a factory administrator. Diagnostic server 120 can be hosted by any type of computing device including desktop computers, laptop computers, handheld computers or similar computing device. Automated corrective and predictive maintenance system 130 can be hosted by any type of computing device including desktop computers, laptop computers, handheld computers or similar computing device. Security server 140 can be hosted by any type of computing device including desktop computers, laptop computers, handheld computers or similar computing device.

Support team system 160 can be maintained by a support team that can be at the same physical location or a different physical location than tool 110, diagnostic server 120, and automated corrective and predictive maintenance system 130. Support team system 160 can be hosted by any type of computing device including desktop computers, laptop computers, handheld computers or similar computing device. Vendor system 170 can be maintained by a vendor of one or more tools or parts of tools and may be at the same physical location or a different physical location than tool 110, diagnostic server 120, and automated corrective and predictive maintenance system 130. Vendor system 170 can be hosted by any type of computing device including desktop computers, laptop computers, handheld computers or similar computing device.

Supplier server 180 can be maintained by a supplier of one or more tools or parts of tools and may be at the same physical location or a different physical location than tool 110, diagnostic server 120, and automated corrective and predictive maintenance system 130. Supplier server 180 can be hosted by any type of computing device including desktop computers, laptop computers, handheld computers or similar computing device. Advanced planning system 190 can be hosted by any type of computing device including desktop computers, laptop computers, handheld computers or similar computing device.

Tool 110, diagnostic server 120, automated corrective and predictive maintenance system 130, and security server 140 can communicate with each other via a hardware interface (not shown), or via a network (not shown). Security server 140 may communicate to support team system 160, vendor 170, supplier server 180 and the advanced planning system 190 via network 150. Network 150 can be a local area network (LAN), such as an intranet within a company, a wireless network, a mobile communications network, a wide area network (WAN), such as the Internet or similar communication system. Network 150 can include any number of networking and computing devices such as wired and wireless devices.

Tool 110 can send current performance characteristics of tool 110 to diagnostic server 120 and security server 140. Supplier server 180 can send a model of tool 110 to diagnostic server 120 through security server 140. A model can specify performance characteristics of tool 110 that correspond to normal behavior of tool 110. Diagnostic server 120 can create notifications for tool 110 in accordance with the model of tool 110. In one embodiment, the models of tool 110 may be provided by a field engineer or may be created based on knowledge of the field engineer. In an alternate embodiment, the models of tool 110 may be created by performing a simulation of a failure in a lab. In another alternate embodiment, the models of tool 110 may be created by a supplier of the tool and provided to diagnostic server 120 by supplier server 180 via security server 140. In one embodiment, diagnostic server monitors performance of tool 110 and compares current performance characteristics of tool 110 with the model of tool 110. Upon detecting a deviation of any performance characteristic from the model 110, diagnostic server 120 creates a notification. The notification can specify one or more failures that are predicted to occur for tool 110 and may include a date or a number of days by which the failure is expected to occur. Once notifications for tool 110 are created, diagnostic server 120 passes the notifications to automated corrective and predictive maintenance system 130.

Upon receiving a notification predicting a failure of tool 110 from diagnostic server 120, automated corrected and predictive maintenance system 130 can obtain maintenance data including one or more maintenance events for tool 110 from persistent storage (not shown) accessible to automated corrected and predictive maintenance system 130. The maintenance data can also include a date or a number of days until the maintenance must be performed for each of the maintenance events. Maintenance events may include, for example, a date by which the tool must be cleaned, a date by which the fluid levels within the tool must be topped off, a date by which a part in the tool must be replaced, a date by which firmware or software for the tool must be updated, etc.

Automated corrective and predictive maintenance system 130 can merge the failure event(s) indicated in the notification and the maintenance events to create an optimal schedule for the tool with an optimal set of options to schedule the known maintenance events for tool 110 and the failure events for tool 110 that occur within a predetermined amount of time from each other in order to minimize the down time of tool 110. The optimal schedule can be used by automated corrective and predictive maintenance system 130 to notify support team system 160 of needed scheduled and unscheduled maintenance of tool 110. The optimal schedule can be used by predictive maintenance system 130 to notify vendor system 170 for parts required to perform maintenance on tool 110. In one embodiment, prior to notifying vendor 170, the required parts information is stored in security server 140.

Advanced planning system 190 can use supply chain simulation data and the optimal schedule created by automated corrective and predictive maintenance system 130 to generate forecasting data for one or more parts in tool 110 or for all tools accessible to advanced planning system 190. Supply chain simulation data may be data obtained by simulating different processes performed by a supply chain containing one or more tools. Advanced planning system 190 can use the forecasting data and supply chain simulation data to optimize inventory maintained by vendor system 170. Advanced planning system 190 can simulate the supply chain of parts of tools accessible to advanced planning system 190 and feed back this simulation data to generate the forecasting data and optimized inventory data. Forecasting data may be data related to an expected number of units of one or more parts of a tool needed in the future. Optimized inventory data may be an optimized amount of inventory (parts) maintained by a supplier.

Figure 2:
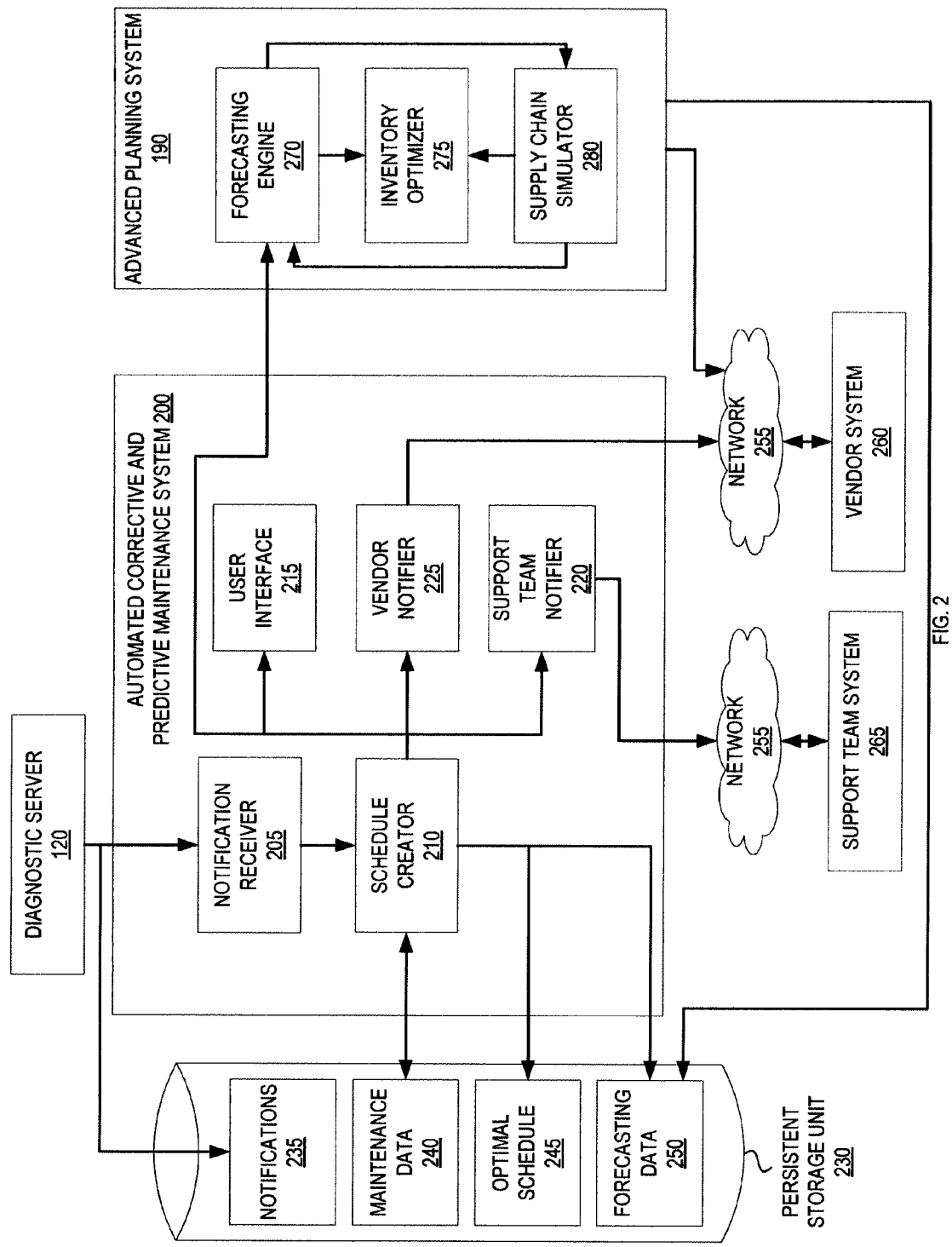
FIG. 2 illustrates an embodiment of an automated corrective and predictive maintenance system and advanced planning system.

FIG. 2 illustrates one embodiment of an automated corrective and predictive maintenance system 200 and advanced planning system 190. In one embodiment, automated corrective and predictive maintenance system 200 is used in to create an optimal schedule proposing an optimal set of options to schedule corrective and predictive actions for a tool to minimize the amount of down time for the tool. In one embodiment, advanced planning system 190 uses data obtained from automated corrective and predictive maintenance system 200 and creates forecasting data, inventory optimization data, and supply chain simulations.

Automated corrective and predictive maintenance system 200 can be coupled to diagnostic server 120, persistent storage unit 230, vendor system 260, support team system 265, and advanced planning system 190. Automated corrective and predictive maintenance system 200 can be coupled to tools, vendors, support teams, or advanced planning systems in addition to or different from diagnostic server 120, vendor system 260, support team system 265, or advanced planning system 190.

Automated corrective and predictive maintenance system 200 can be any type of computing device including desktop computers, laptop computers, handheld computers, workstations, or similar computing device. Automated corrective and predictive maintenance system 200 can communicate with vendor system 260 and support team system 265 over network 255.

Advanced planning system 190 can be any type of computing device including desktop computers, laptop computers, handheld computers, workstations, or similar computing device. Advanced planning system 190 can communicate with vendor system 260 over network 255.

Diagnostic server 120 can store one or more notifications 235 in persistent storage unit 230. Notifications 235 can include one or more failure events associated with a tool. Network 255 can be a local area network (LAN), such as an intranet within a company, a wireless network, a mobile communications network, a wide area network (WAN), such as the Internet or similar communication system. Network 255 can include any number of networking and computing devices such as wired and wireless devices.

Persistent storage unit 230 can be a local storage unit or a remote storage unit coupled to automated corrective and predictive maintenance system 200 via a network. Persistent storage unit 230 can be a magnetic storage unit, optical storage unit, solid state storage unit or similar storage unit. Persistent storage unit 230 can be a monolithic device or a distributed set of devices. A 'set,' as used herein, refers to any positive whole number of items including one.

Automated corrective and predictive maintenance system 200 may contain notification receiver 205, schedule creator 210, user interface 215, support team notifier 220, and vendor notifier 225. This division of functionality is presented by way of example for sake of clarity. One skilled in the art would understand that the functionality described could be combined into a monolithic component or sub-divided into any combination of components.

Notification receiver 205 can receive one or more notifications 235. Notifications 235 can include one or more failure events associated with a tool and can include an expected date (or number of days) for a failure to occur.

Schedule creator 210 can create an optimal schedule for performing scheduled and unscheduled maintenance on the tool based on notifications 235 and maintenance data 240. Maintenance data 240 can include one or more scheduled maintenance events to perform on the tool and a date (or number of days) by which the event must be performed. The optimal schedule can list all scheduled (corrective) maintenance and unscheduled (predictive) maintenance required for the tool that occurs within a predetermined amount of time and a recommended date (nor number of days) by which to perform the maintenance. The optimal schedule therefore can reduce the overall down time of the tool by scheduling events together that will occur within a short period of time from each other. The optimal schedule can be stored in optimal schedule 245. The optimal schedule can be used to update forecasting data 250 with parts required based on the schedule. Forecasting data 250 can include a forecast of parts that will be needed by the tool in the near future. Forecasting data 250 can be used to perform budget analysis for the tool, to determine the performance of a tool, etc. An example of maintenance data 240 is described below in conjunction with FIG. 3A. An example of notifications 235 is described below in conjunction with FIG. 3B. An example of optimal schedule 245 is described below in conjunction with FIG. 4. One embodiment of the optimal schedule creation is described below in conjunction with FIG. 6.

User interface 215 can provide a graphical user interface to a user to present the optimal schedule created by schedule creator 210. An example of the graphical user interface created by user interface 220 is described below in conjunction with FIG. 8.

Support team notifier 220 can create a support team notification for support team system 265 that maintenance is required for a tool based on the optimal schedule provided by schedule creator 210. In one embodiment, the support team notification can include the schedule created by schedule creator 210. In an alternate embodiment, the support team notification can include an indication that support team system 265 needs to contact a user of the tool to determine a date and time for maintenance to be performed on the tool.

Vendor notifier 225 can create a vendor notification for vendor system 260 that maintenance is required for the tool based on the optimal schedule provided by schedule creator 210. In one embodiment, vendor notifier 225 can parse data in the optimal schedule created by schedule creator 210 to determine one or more parts supplied by vendor system 260 that need to be replaced. In this embodiment, vendor notifier 225 creates a notification for vendor system 260 that includes a list of the parts supplied by vendor system 260 that need to be replaced. In an alternate embodiment, vendor notifier 225 sends a notification that only includes an indication to vendor system 260 that maintenance is required for a tool and that vendor system 260 needs to contact a user of the tool to determine a date by which parts supplied by vendor system 260 are required. Vendor system 260 can determine whether one or more parts required based on the optimal schedule are in inventory maintained by vendor system 260. If a part required based on the optimal schedule is not in inventory maintained by vendor system 260, vendor system 260 may order the part from another vendor (not shown).

Advanced planning system 190 may contain forecasting engine 270, inventory optimizer 275, and supply chain simulator 280. This division of functionality is presented by way of example for sake of clarity. One skilled in the art would understand that the functionality described could be combined into a monolithic component or sub-divided into any combination of components.

Forecasting engine 270 generates forecasting data for one or more parts. Forecasting engine 270 can use various forecasting techniques to determine forecasts for a part. A forecast is an estimate of the expected number of units needed for a particular part in a tool in the future. For example, six units of part X may be forecasted to be needed. The various forecasting techniques may include moving average, exponential smoothing with smoothing factor search, Croston's method, installed base driven causal forecasting using multiple regression, naïve and enhanced bootstrapping methods, combined forecasts, and forecasted requirements based on the optimal schedule provided by schedule creator 210 in automated corrective and predictive maintenance system 200, etc. The forecasted requirements based on the optimal schedule forecasting technique uses the parts included in the optimal schedule to determine a number of units of the parts that will be needed in the future. In one embodiment, forecasting engine 270 further assesses the performance of the various forecasting techniques by determining the accuracy of the techniques and picking the best performing technique. In this embodiment, forecasting engine 270 may determine which technique provides better forecasts by using forecast error to determine better forecasts for fast moving parts or the total cost of inventory and backorder costs to determine better forecasts for slow moving parts.

In one embodiment, forecasting engine 270 may generate forecasts for slow moving parts and forecasts for fast moving parts using different techniques. In one embodiment, a fast moving part may be a part that is replaced frequently (e.g., once per week, once per month, etc.). In one embodiment, a slow moving part may be a part that is replaced infrequently (e.g., once per year, once every eighteen months, etc.). In one embodiment, fractional forecasts may be generated for slow moving parts (e.g., 1.5 parts per month). In one embodiment, carry forward rounding may be used to generate forecasts for fast moving parts (e.g., 1.8 parts per month is rounded to 2 parts per month). In one embodiment, the forecasts generated by forecasting engine 270 may be used to update forecasting data 250.

Inventory optimizer 275 optimizes the amount of inventory maintained by a supplier, such as vendor system 260. Inventory optimizer 275 can determine which part to stock and the location which to store the stocked parts. Inventory optimizer 275 can determine how many units of a part to store based on forecasting data received from forecasting engine 270. Inventory optimizer 275 can further determine an optimum distribution network strategy for a part. An optimum distribution network strategy for a part may include directly shipping the part from a vendor, such as vendor system 260, to a customer, vendor managed inventory (VMI) at the vendor, or other low cost distribution strategies.

Inventory optimizer 275 may further optimize the total cost for a given network, such as network 255. In one embodiment, inventory optimizer 275 may determine the total cost for a range of service level constraints. A service level measures the performance of the supply chain. It is very expensive to keep the performance of the supply chain at or near one hundred percent. Therefore, inventory optimizer 275 can determine the total cost for different levels, or constraints, of the service level (less than one hundred percent). Inventory optimizer 275 can further approximate backorders using such techniques as METRIC and two parameter approximations and may also perform multi-indenture inventory optimization or inventory optimization using batch ordering. The optimized inventory generated by inventory optimizer 275 can be used to recommend Economic Order Quantities (EOQ) for order procurement. Inventory optimizer 275 can analyze various distribution mode options, such as ocean versus air freight, priority mail, next flight out, etc. and optimize transit teams based on this information.

Inventory optimizer 275 can model different service objectives, such as fill-rate, expected wait time, equipment availability, mean down wait part, etc and provide optimized inventory based on these different service objectives. Inventory optimizer 275 can optimize inventory based on various item level exceptions or user overrides, such as do not stock, stock at least, stock at most, etc.

Supply chain simulator 280 can simulate different processes performed by the supply chain. For example, the processes performed by a tool may include periodic forecasting process, periodic inventory planning process, replenishment process, procurement process, etc. The impact of changes to the processes may be simulated by supply chain simulator 280, such as a part in a tool used by the supply chain becoming obsolete or delayed replenishment of a part in a tool used by the supply chain. The results of the simulation can be fed back to forecasting engine 270 and inventory optimizer 275.

FIG. 3A illustrates exemplary maintenance data used by an automated corrective and predictive maintenance system. Maintenance data 300 includes maintenance events for a tool (e.g., 305, 310, 315, and 320) and a date associated with each maintenance event (e.g., 325, 330, 335, and 340). Clean tool 305 must be performed by date "01/01/2010" 325. Replace part 310 must be performed by date "12/31/2010" 330. Update software 315 must be performed by date "01/15/2010" 335. Update firmware 320 must be performed by date "01/30/2010" 340.

FIG. 3B illustrates exemplary notification data used by an automated corrective and predictive maintenance system. Notification data 350 includes failure events indicating a prediction of a failure for a tool (e.g., 355 and 360) and a date associated with each failure event (e.g., 365 and 370). Clean chamber X 355 must be performed by date "01/01/2010" 365. Part Y fail 360 will occur by date "01/17/2010" 370, and therefore preventative action should be taken prior to that date to avoid the failure of part Y.

FIG. 4 illustrates an exemplary optimal scheduled created by an automated corrective and predictive maintenance system. Optimal schedule 400 includes an optimal set of options to schedule the maintenance events (corrective actions) and failure events (predictive actions) in order to cause the least amount of down time for a tool. The failure events from notification data 350 of FIG. 3A and the maintenance events from maintenance data 300 of FIG. 3B that fall within a predetermined amount of time in the future are included in optimal schedule 400. In this embodiment, the predetermined amount of time is eighteen days. Therefore, when merging the data from maintenance data 300 and notification data 350, only events that are within 18 days of the earliest date (either maintenance event date or failure event date) are included in optimal schedule 400. In this embodiment, the earliest date is 01/01/2010. Therefore, optimal schedule 400 includes events 410 for clean tool, top off fluid levels, clean chamber X, update software, and part Y failure prevention and the dates 420 that each of events 410 must be performed.

Figure 5:
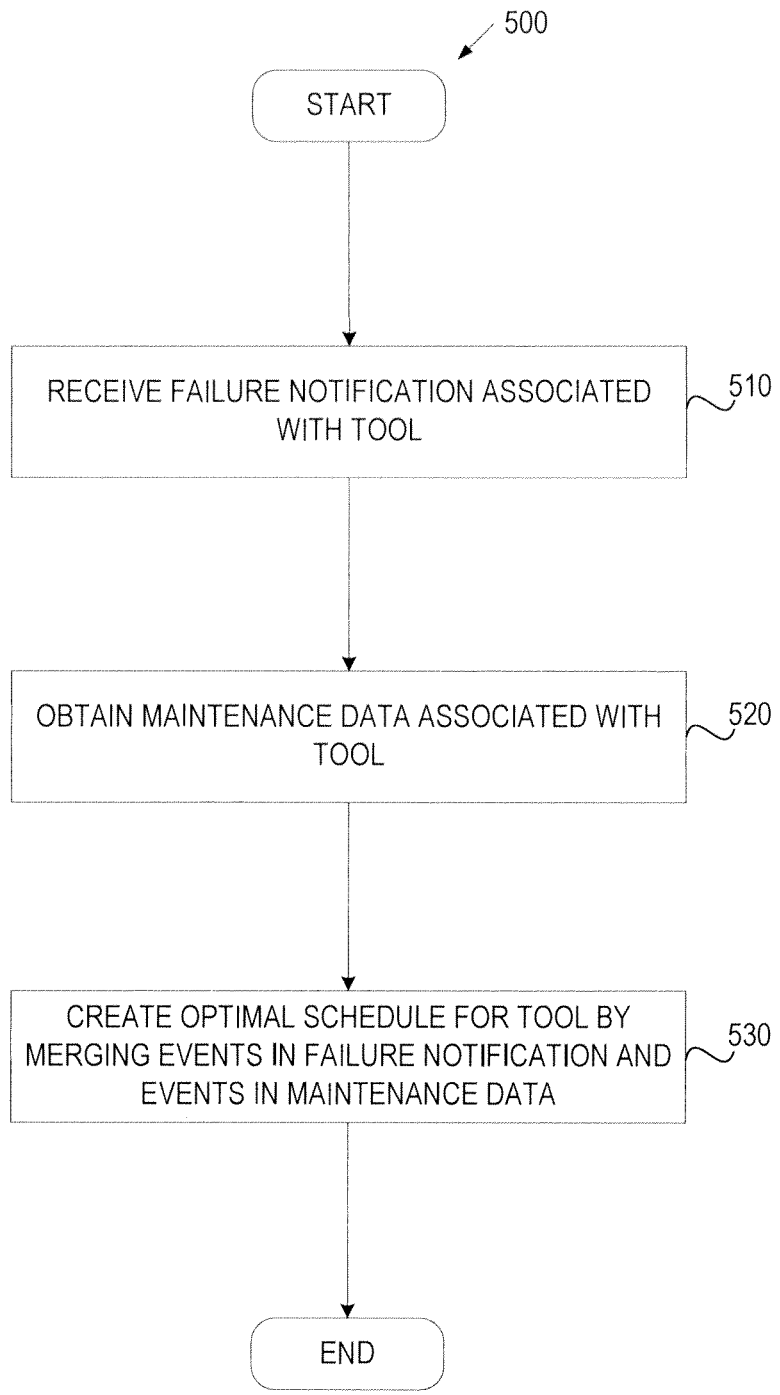
FIG. 5 illustrates a flow diagram of an automated corrective and predictive maintenance method in accordance with embodiments of the present invention.

FIG. 5 illustrates one embodiment of a method 500 for automated corrective and predictive maintenance. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by automated corrective and predictive system 200 of FIG. 2.

At block 510, a failure notification associated with a tool is received. The failure notification can include failure events about a failure of the tool (e.g., part of the tool that will fail). In one embodiment, the failure notification can further include an expected date of failure for the tool. In an alternate embodiment, the failure notification can further include a number of days or hours in which the tool is expected to fail (e.g., 3 days, 3 hours, etc.). For example, a failure event can state that a certain part in the tool is going to fail, that the tool needs to be cleaned, that a certain part in the tool needs to be calibrated, that a certain part in the tool needs to be reset, etc.

At block 520, maintenance data associated with the tool is obtained from a storage unit storing maintenance data. In this embodiment, the receipt of the failure notification may trigger obtaining the maintenance data. In an alternate embodiment, the maintenance data is obtained periodically (e.g., at predetermined time intervals) from a storage unit. The maintenance data can include one or more maintenance events that are scheduled for the tool. In one embodiment, the maintenance data can further include a date by which each maintenance event must be performed. In an alternate embodiment, the maintenance data can further include a number of days or hours by which each maintenance event must be performed. For example, a maintenance event can state that a certain part in the tool needs to be replaced, that the tool needs to be cleaned, that a certain part of the tool needs to be calibrated, that a certain part in the tool needs to be reset, etc.

At block 530, an optimal schedule is created for the tool by merging events in the failure notification and the maintenance data. The schedule proposes an optimal set of options to schedule any maintenance events included in the maintenance data with any failure events included in the failure notification and the dates that the events must be performed by in order to decrease the amount of down time for the tool. One embodiment of creating the schedule is described in more detail below in conjunction with FIG. 6.

In one embodiment, the optimal schedule can automatically be sent over a network to a vendor such that the vendor can determine one or more parts in the tool that need to be replaced. In this embodiment, the vendor may access the records of the user to obtain information about the tools used by the user, shipping information for the user, etc. and ship the parts to the user without a user needing to request the parts. In one embodiment, the schedule can automatically be sent over a network to a support team such that the support team can contact a user of the tool to determine a convenient time to perform the events in the optimal schedule for the tool. In one embodiment, the schedule is used to automatically update one or more forecasts for parts usage for the tool. In one embodiment, the forecasting data is updated based on parts needed by the optimal schedule. In this embodiment, the predictive events may occur on a regular basis for a particular part of the tool and therefore, the forecast for that particular part may be increased based on the continued failure of the part.

Figure 6:
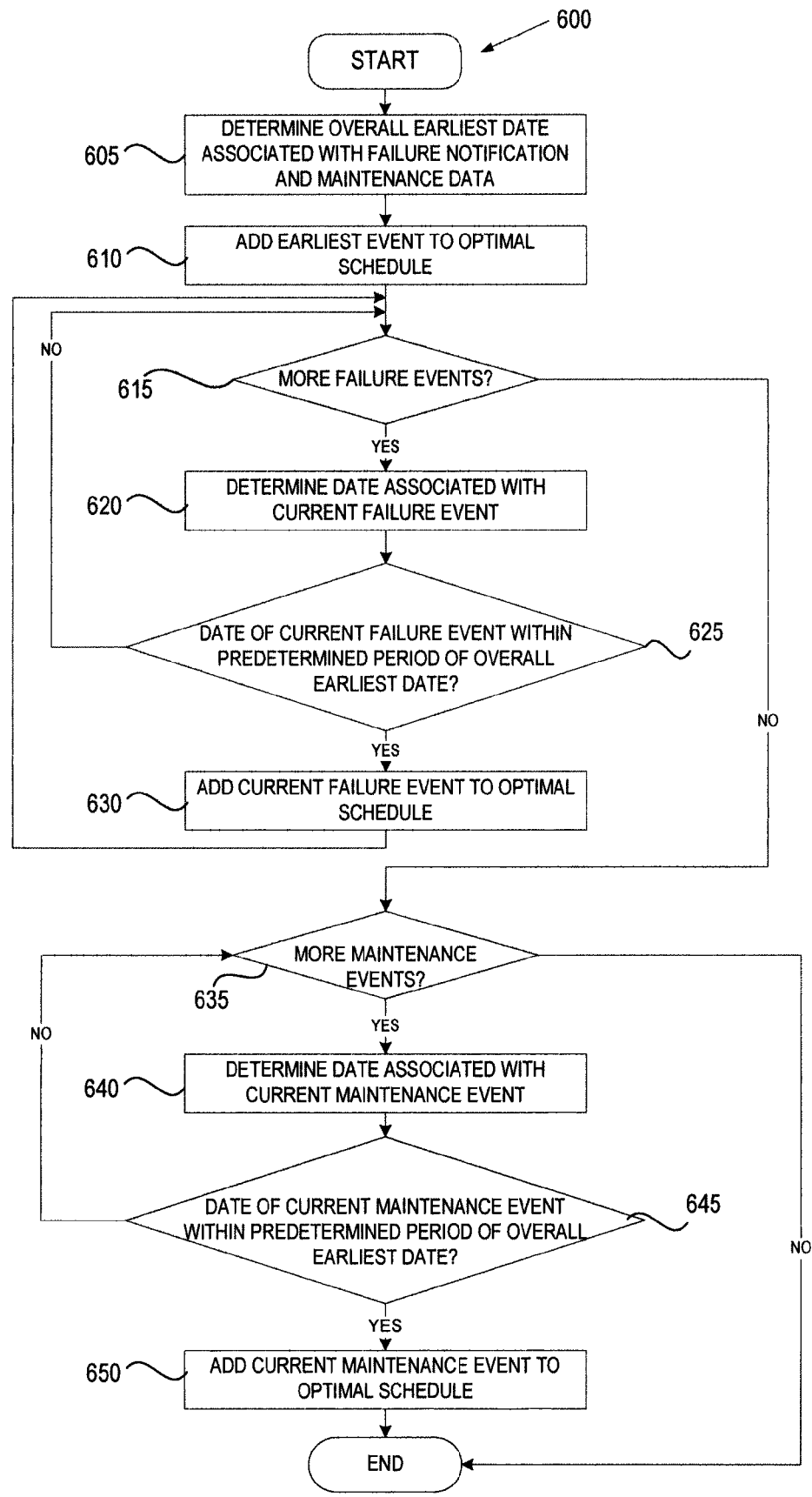
FIG. 6 illustrates a flow diagram of an optimal schedule creation method in accordance with embodiments of the present invention.

FIG. 6 illustrates one embodiment of a method 600 for creation of an optimal schedule creation. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by schedule creator 210 of FIG. 2.

At block 605, the overall earliest date associated with a failure notification and maintenance data is determined. The overall earliest date may be determined by extracting each date from the events in the failure notification, extracting each date from the maintenance events in the maintenance data, and comparing the dates to determine which date is the earliest. In one embodiment, if no date is associated with a failure event or a maintenance event, the overall earliest date may be determined to be a date maintained by an internal clock in the system running method 600. In an alternate embodiment, if no date is associated with a failure event or a maintenance event, that event can be set as the overall earliest date associated with the failure notification and maintenance data.

At block 610, the earliest event associated with the overall earliest date is added to the optimal schedule. In one embodiment, the overall earliest date is added to the optimal schedule in addition to the earliest event.

At block 615, a determination is made of whether there are more failure events in the failure notification. If there are no more events in the failure notification, the method proceeds to block 635. If there are additional failure events to consider in the failure notification, the method proceeds to block 620.

At block 620, the date associated with the current failure event is determined. In one embodiment, the date can be determined by extracting the date associated with the current failure event from the failure notification. In one embodiment, if no date is associated with the current failure event, the date may be determined to be a date maintained by an internal clock in the system running method 700. In an alternate embodiment, if no date is associated with the current failure event, that event can be set to the same date as the overall earliest date associated with the failure notification and maintenance data (determined at block 605).

At block 625, a determination is made of whether the date of the current failure event is within a predetermined period of time of the overall earliest date. In one embodiment, the determination can be made by comparing the date of the current failure event to the overall earliest date. In one embodiment, the predetermined period of time is set by a user of a tool associated with the maintenance data and the failure notification. In an alternate embodiment, the predetermined period of time is predetermined by the supplier of the tool. For example, the predetermined period of time may be seven days, thirty days, one year, etc.

If the date of the current failure event fails within the predetermined period of time, the current failure event is added to the optimal schedule at block 630. In one embodiment, the date of the current failure event is also added for the current failure event in the optimal schedule. In an alternate embodiment, the overall earliest date is added for the current failure event in the optimal schedule. In another alternate embodiment, no date is included for the current failure event in the optimal schedule. For example, if the overall earliest date was 01/01/2010, the failure event was 01/15/10, and the predetermined period of time was thirty days, the failure event would be added to the optimal schedule because the date of the failure event is fourteen days from the overall earliest date, which is less than the maximum of thirty days. If the date of the current failure event does not fall within the predetermined period of time, the failure event is not added to the optimal schedule, and the method proceeds back to block 615 to determine if there are more failure events in the failure notification. For example, if the overall earliest date was 01/01/2010, the failure event was 01/15/10, and the predetermined period of time was seven days, the failure event would not be added to the optimal schedule because the date of the failure event is fourteen days from the overall earliest date, which is greater than the maximum of seven days.

At block 635, a determination is made of whether there are more maintenance events in the maintenance data. If there are no more events in the maintenance data, the method ends and the created optimal schedule proposes to perform the maintenance events and the failure that fall within the predetermined period of time by the overall earliest date. If there are additional maintenance events to consider in the maintenance data, the method proceeds to block 640.

At block 640, the date associated with the current maintenance event is determined. In one embodiment, the date can be determined by extracting the date associated with the current maintenance event from the maintenance data. In one embodiment, if no date is associated with the current maintenance event, the date may be determined to be a date maintained by an internal clock in the system running method 600. In an alternate embodiment, if no date is associated with the current maintenance event, that event can be set to the same date as the overall earliest date associated with the failure notification and maintenance data (as determined at block 605).

At block 645, a determination is made of whether the date of the current maintenance event is within a predetermined period of time of the overall earliest date. In one embodiment, the determination can be made by comparing the date of the current maintenance event to the overall earliest date. In one embodiment, the predetermined period of time is set by a user of a tool associated with the maintenance data and the failure notification. In an alternate embodiment, the predetermined period of time is predetermined by a supplier of the tool. For example, the predetermined period of time may be seven days, thirty days, one year, etc.

If the date of the current maintenance event fails within the predetermined period of time, the current maintenance event is added to the optimal schedule at block 650. In one embodiment, the date of the current maintenance event is also added for the current maintenance event in the optimal schedule. In an alternate embodiment, the overall earliest date is added for the current maintenance event in the optimal schedule. In another alternate embodiment, no date is included for the current maintenance event in the optimal schedule. For example, if the overall earliest date was 01/01/2010, the maintenance event was 01/15/10, and the predetermined period of time was thirty days, the maintenance event would be added to the optimal schedule because the date of the maintenance event is fourteen days from the overall earliest date, which is less than the maximum of thirty days. If the date of the current maintenance event does not fall within the predetermined period of time, the failure event is not added to the optimal schedule, and the method proceeds back to block 635 to determine if there are more maintenance events in the maintenance data. For example, if the overall earliest date was 01/01/2010, the maintenance event was 01/15/10, and the predetermined period of time was seven days, the maintenance event would not be added to the optimal schedule because the date of the maintenance event is fourteen days from the overall earliest date, which is greater than the maximum of seven days.

Figure 7:
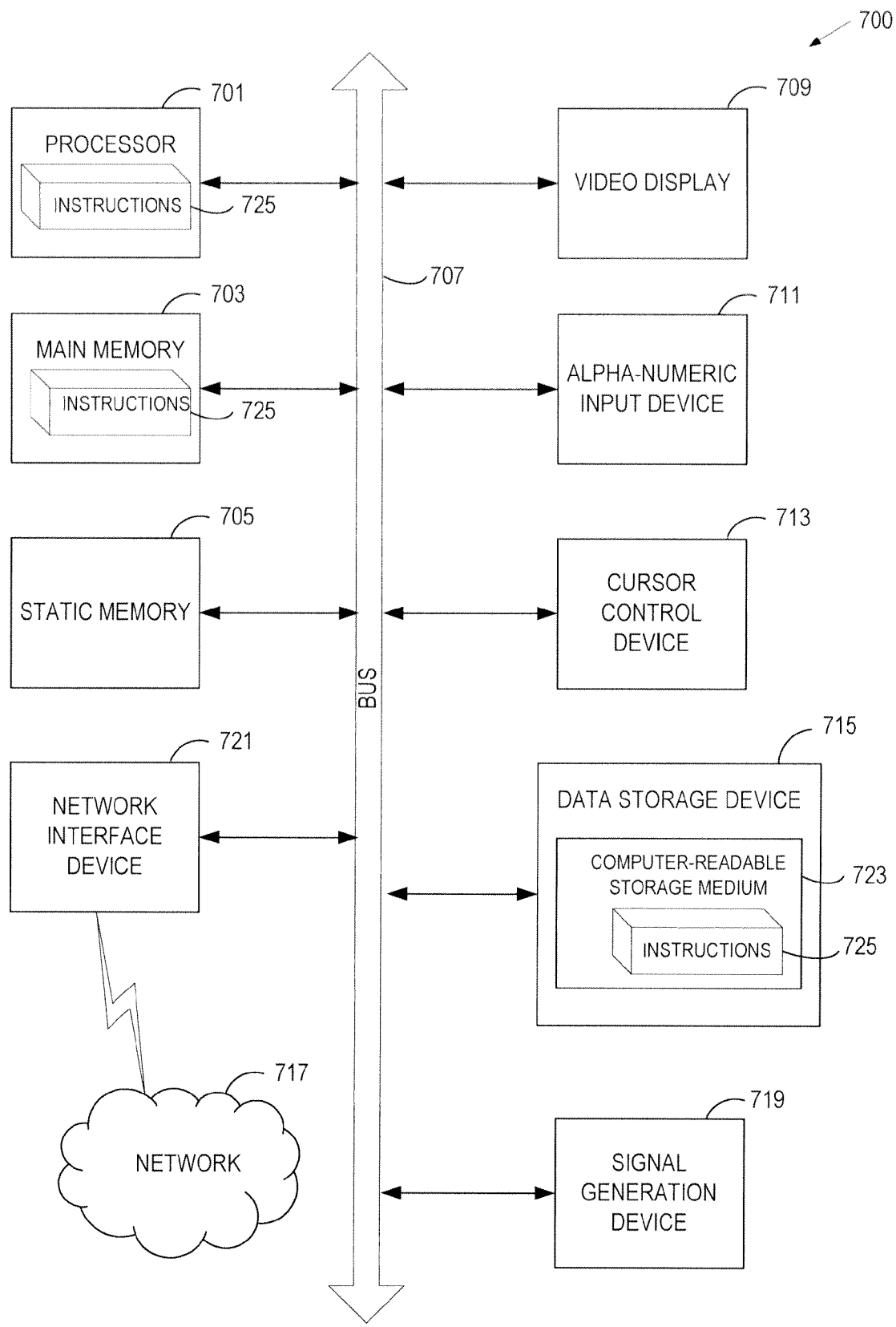
FIG. 7 illustrates an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 701, a main memory 703 (e.g., read-only memory (ROM), flash memory, dynamic random access memory (DRAM) such as synchronous DRAM (SDRAM) or Rambus DRAM (RDRAM), etc.), a static memory 705 (e.g., flash memory, static random access memory (SRAM), etc.), and a data storage device 715 (e.g., drive unit), which communicate with each other via a bus 707.

The processor 701 represents one or more general-purpose processing devices such as a microprocessor, central processing unit, or the like. More particularly, the processor 701 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 701 may also be one or more special-purpose processing devices such as an application specific integrated circuit (ASIC), a field programmable gate array (FPGA), a digital signal processor (DSP), network processor, or the like. The processor 701 is configured to execute the instructions 725 for performing the operations and steps discussed herein.

The computer system 700 may further include a network interface device 721. The computer system 700 also may include a video display unit 709 (e.g., a liquid crystal display (LCD) or a cathode ray tube (CRT)), an alphanumeric input device 711 (e.g., a keyboard), a cursor control device 713 (e.g., a mouse), and a signal generation device 719 (e.g., a speaker).

The data storage device 715 may include a computer-readable storage medium 723 on which is stored one or more sets of instructions 725 (e.g., software) embodying any one or more of the methodologies or functions described herein. The instructions 725 may also reside, completely or at least partially, within the main memory 703 and/or within the processor 701 during execution thereof by the computer system 700, the main memory 703 and the processor 701 also constituting computer-readable storage media. The instructions 725 may further be transmitted or received over a network 717 via the network interface device 721.

The computer-readable storage medium 723 may also be used to store data structure sets that define user identifying states and user preferences that define user profiles. Data structure sets and user profiles may also be stored in other sections of computer system 700, such as static memory 705.

While the computer-readable storage medium 723 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories and optical and magnetic media.

Figure 8:
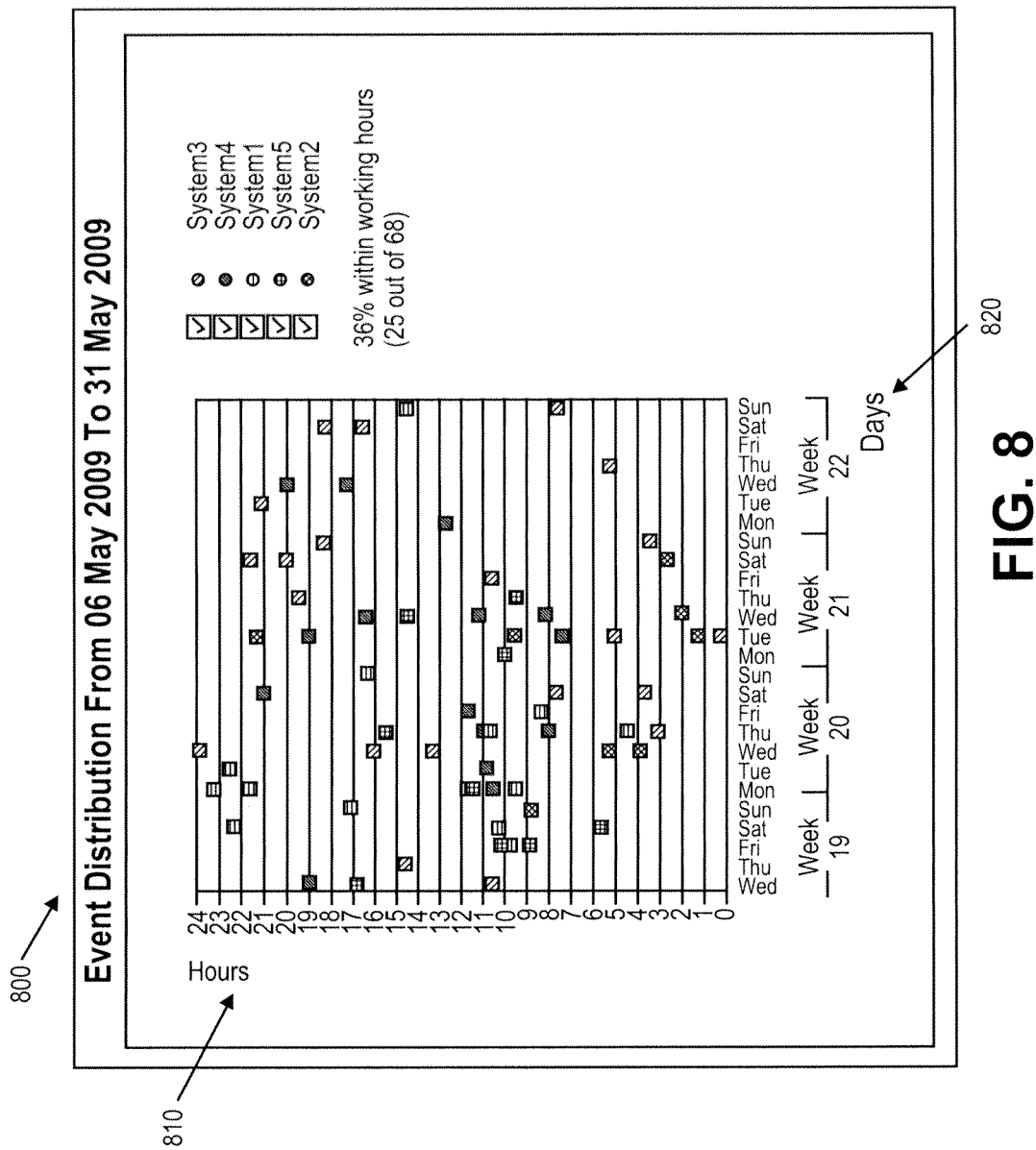
FIG. 8 illustrates an exemplary user interface provided by an automated corrective and predictive maintenance system in accordance with embodiments of the present invention.

FIG. 8 illustrates an exemplary user interface provided by an automated corrective and predictive maintenance system. User interface 800 includes a graphical representation of the events in the optimal schedule. User interface 800 includes the distribution of events over a number of days 820 and the hour in the day 810 that the event occurred.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "identifying", "comparing", "sending", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relates to an apparatus for performing the operations herein. This apparatus can be specially constructed for the required purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of the invention as described herein.

A machine-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

It is to be understood that the above description is intended to be illustrative, and not restrictive. Many other embodiments will be apparent to those of skill in the art upon reading and understanding the above description.

What is claimed is:

1. A computer-implemented method comprising:
   receiving, by a computing device, a failure notification associated with a tool, wherein the failure notification indicates one or more predictive maintenance events for one or more failures that are predicted to occur for the tool;
   obtaining, by the computing device, maintenance data associated with the tool, wherein the maintenance data includes one or more corrective maintenance events for the tool, wherein the one or more corrective maintenance events are different than the one or more predictive maintenance events; and
   creating, by the computing device, an optimal schedule for the tool, by combining the one or more predictive maintenance events with the one or more corrective maintenance events to schedule a plurality of corrective and predictive maintenance events to occur for the tool during the same maintenance period based on at least one known corrective maintenance event for the tool and one or more predictive maintenance events that occur within a predetermined amount of time from each other.

2. The computer-implemented method of claim 1, further comprising:
   presenting the optimal schedule to a user using a user interface.

3. The computer-implemented method of claim 1, wherein combining the one or more predictive maintenance events with the one or more corrective maintenance events comprises:
   determining an overall earliest date associated with the failure notification and the maintenance data;
   adding an earliest event associated with the overall earliest date to the optimal schedule;
   for each predictive maintenance event included in the failure notification,
      determining a date associated with the predictive maintenance event,
      determining whether the date associated with the failure predictive maintenance event falls within a predetermined period of time of the overall earliest date, and
      adding the predictive maintenance event to the optimal schedule if the date associated with the predictive maintenance event does fall within a predetermined period of time of the overall earliest date; and
   for each corrective maintenance event included in the maintenance data,
      determining a date associated with the corrective maintenance event,
      determining whether the date associated with the corrective maintenance event falls within a predetermined period of time of the overall earliest date, and
      adding the corrective maintenance event to the optimal schedule if the date associated with the corrective maintenance event does fall within a predetermined period of time of the overall earliest date.

4. The computer-implemented method of claim 1, further comprising:
   automatically notifying a vendor of a part associated with the tool that the part needs to be replaced in accordance with the optimal schedule.

5. The computer-implemented method of claim 1, further comprising:
   automatically updating forecasting data associated with the part in accordance with the optimal schedule.

6. The computer-implemented method of claim 1, wherein the optimal schedule provides a set of corrective maintenance events and a set of predictive maintenance events to be performed by the overall earliest date.

7. The computer-implemented method of claim 1, further comprising:
   automatically notifying a support team of the tool of the optimal schedule.

8. A non-transitory computer-readable storage medium comprising executable instructions to cause a processor to perform operations, the instructions comprising:

receiving a failure notification associated with a tool, wherein the failure notification indicates one or more predictive maintenance events for one or more failures that are predicted to occur for the tool;

obtaining maintenance data associated with the tool, wherein the maintenance data includes one or more corrective maintenance events for the tool, wherein the one or more corrective maintenance events are different than the one or more predictive maintenance events; and creating an optimal schedule for the tool, by combining the one or more predictive maintenance events with the one or more corrective maintenance events to schedule a plurality of corrective and predictive maintenance events to occur for the tool during the same maintenance period based on at least one known corrective maintenance event for the tool and one or more predictive maintenance events that occur within a predetermined amount of time from each other.

9. The non-transitory computer-readable storage medium of claim 8, wherein the instructions further comprise:
presenting the optimal schedule to a user using a user interface.

10. The non-transitory computer-readable storage medium of claim 8, wherein the instructions for combining the one or more predictive maintenance events with the one or more corrective maintenance events:
determining an overall earliest date associated with the failure notification and the maintenance data;
adding an earliest event associated with the overall earliest date to the optimal schedule;
for each predictive maintenance event included in the failure notification,
determining a date associated with the predictive maintenance event,
determining whether the date associated with the predictive maintenance event falls within a predetermined period of time of the overall earliest date, and
adding the failure predictive maintenance event to the optimal schedule if the date associated with the predictive maintenance event does fall within a predetermined period of time of the overall earliest date; and
for each corrective maintenance event included in the maintenance data,
determining a date associated with the corrective maintenance event,
determining whether the date associated with the corrective maintenance event falls within a predetermined period of time of the overall earliest date, and
adding the corrective maintenance event to the optimal schedule if the date associated with the corrective maintenance event does fall within a predetermined period of time of the overall earliest date.

11. The non-transitory computer-readable storage medium of claim 8, wherein the instructions further comprise:
automatically notifying a vendor of a part associated with the tool that the part needs to be replaced in accordance with the optimal schedule.

12. The non-transitory computer-readable storage medium of claim 8, wherein the instructions further comprise:
automatically updating forecasting data associated with the part in accordance with the optimal schedule.

13. The non-transitory computer-readable storage medium of claim 8, wherein the optimal schedule provides a set of corrective maintenance events and a set of predictive maintenance events to be performed by the overall earliest date.

14. The non-transitory computer-readable storage medium of claim 8, wherein the instructions further comprise:
automatically notifying a support team of the tool of the optimal schedule.

15. The non-transitory computer-readable storage medium of claim 8, wherein the instructions further comprise:
automatically notifying a support team of the tool of the optimal schedule.

16. A computer system comprising:
a memory; and
a processor configurable by instructions stored in the memory to:
receive a failure notification associated with a tool, wherein the failure notification indicates one or more predictive maintenance events for one or more failures that are predicted to occur for the tool,
obtain maintenance data associated with the tool, wherein the maintenance data includes one or more corrective maintenance events for the tool, wherein the one or more corrective maintenance events are different than the one or more predictive maintenance events, and
create an optimal schedule for the tool, by combining the one or more predictive maintenance events with the one or more corrective maintenance events to schedule a plurality of corrective and predictive maintenance events to occur for the tool during the same maintenance period based on at least one known corrective maintenance event for the tool and one or more predictive maintenance events that occur within a predetermined amount of time from each other.

17. The computer system of claim 16, wherein the processor is further to:
present the optimal schedule to a user using a user interface.

18. The computer system of claim 16, wherein the processor is to create the optimal schedule for the tool by:
determining an overall earliest date associated with the failure notification and the maintenance data;
adding an earliest event associated with the overall earliest date to the optimal schedule;
for each predictive maintenance event included in the failure notification,
determining a date associated with the predictive maintenance event,
determining whether the date associated with the predictive maintenance event falls within a predetermined period of time of the overall earliest date, and
adding the predictive maintenance event to the optimal schedule if the date associated with the predictive maintenance event does fall within a predetermined period of time of the overall earliest date; and
for each corrective maintenance event included in the maintenance data,
determining a date associated with the corrective maintenance event,
determining whether the date associated with the corrective maintenance event falls within a predetermined period of time of the overall earliest date, and
adding the corrective maintenance event to the optimal schedule if the date associated with the corrective maintenance event does fall within a predetermined period of time of the overall earliest date.

19. The computer system of claim 16, wherein the processor is further to:
notify a vendor of a part associated with the tool that the part needs to be replaced in accordance with the optimal schedule.

20. The computer system of claim 16, wherein the processor is further to:
   update forecasting data associated with the part in accordance with the optimal schedule.

21. The computer system of claim 16, wherein the optimal schedule provides a set of corrective maintenance events and a set of predictive maintenance events to be performed by the overall earliest date.

22. The computer system of claim 16, wherein the processor is further to:
   notify a support team of the tool of the optimal schedule.

* * * * *